US008706745B1

(12) United States Patent
Cooley et al.

(10) Patent No.: US 8,706,745 B1
(45) Date of Patent: Apr. 22, 2014

(54) SYSTEMS AND METHODS FOR DETERMINING A FILE SET

(75) Inventors: Shaun Cooley, El Segundo, CA (US); William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1140 days.

(21) Appl. No.: 12/130,839

(22) Filed: May 30, 2008

(51) Int. Cl.
*G06F 7/00* (2006.01)
*G06F 17/30* (2006.01)

(52) U.S. Cl.
USPC .............................. 707/758; 707/796; 726/24

(58) Field of Classification Search
USPC ................... 707/758, 796, 999.001
See application file for complete search history.

(56) References Cited

U.S. PATENT DOCUMENTS

| | | | | |
|---|---|---|---|---|
| 6,018,619 | A * | 1/2000 | Allard et al. | 709/224 |
| 6,038,603 | A * | 3/2000 | Joseph | 709/228 |
| 6,092,114 | A * | 7/2000 | Shaffer et al. | 709/232 |
| 6,181,692 | B1 * | 1/2001 | DeGolia, Jr. | 370/352 |
| 6,317,754 | B1 * | 11/2001 | Peng | 707/610 |
| 6,571,245 | B2 | 5/2003 | Huang et al. | |
| 6,772,340 | B1 * | 8/2004 | Peinado et al. | 713/168 |
| 7,116,782 | B2 * | 10/2006 | Jackson et al. | 380/251 |
| 7,536,420 | B2 * | 5/2009 | Takashima | 1/1 |
| 7,756,836 | B2 | 7/2010 | Aboulhosn et al. | |
| 7,802,303 | B1 | 9/2010 | Zhao et al. | |
| 8,024,306 | B2 | 9/2011 | Palliyil et al. | |
| 8,255,993 | B2 | 8/2012 | Cooley et al. | |
| 8,302,193 | B1 | 10/2012 | Gardner et al. | |
| 8,364,705 | B1 | 1/2013 | Cooley et al. | |
| 2002/0055935 | A1 | 5/2002 | Rosenblum | |
| 2002/0138760 | A1 | 9/2002 | Naitoh | |
| 2003/0079145 | A1 | 4/2003 | Kouznetsov et al. | |
| 2003/0093384 | A1 * | 5/2003 | Durst et al. | 705/64 |
| 2003/0115147 | A1 * | 6/2003 | Feldman et al. | 705/64 |
| 2003/0196169 | A1 * | 10/2003 | Wittkotter et al. | 715/513 |
| 2003/0233566 | A1 * | 12/2003 | Kouznetsov et al. | 713/200 |
| 2004/0158741 | A1 | 8/2004 | Schneider | |
| 2005/0021994 | A1 | 1/2005 | Barton et al. | |
| 2005/0132206 | A1 | 6/2005 | Palliyil et al. | |
| 2005/0223224 | A1 * | 10/2005 | Carpentier et al. | 713/165 |
| 2006/0021041 | A1 | 1/2006 | Challener et al. | |
| 2006/0041891 | A1 * | 2/2006 | Aaron | 719/315 |
| 2006/0074896 | A1 | 4/2006 | Thomas et al. | |

(Continued)

OTHER PUBLICATIONS

Green et al. "Designating a Fast On-Line Backup System for a Log-structured File System", Digital Technical Journal, 1996.*

(Continued)

*Primary Examiner* — Daniel Kuddus

(74) *Attorney, Agent, or Firm* — ALG Intellectual Property, LLC

(57) ABSTRACT

A computer-implemented method for determining a file set may include identifying a file set and identifying a key file for the file set. The method may also include transmitting a key-file identifier to a second computing system. A first computing system may receive first and second file identifiers from a second computing system. The first computing system may determine whether the file set comprises a file identified by the first file identifier, and whether the file set comprises a file identified by the second file identifier. The method also includes transmitting a result of the determination to the second computing system. A method for determining a file set on a second computing device is also disclosed. Corresponding systems and computer-readable media are also disclosed.

20 Claims, 10 Drawing Sheets

(56) References Cited

U.S. PATENT DOCUMENTS

| | | | |
|---|---|---|---|
| 2006/0080737 | A1 | 4/2006 | Freeman et al. |
| 2006/0143713 | A1 | 6/2006 | Challener et al. |
| 2006/0248310 | A1 | 11/2006 | Kavalam et al. |
| 2006/0259901 | A1* | 11/2006 | Kaplan ............ 717/168 |
| 2006/0272021 | A1* | 11/2006 | Marinescu et al. ....... 726/24 |
| 2007/0028110 | A1* | 2/2007 | Brennan ............ 713/176 |
| 2007/0028304 | A1* | 2/2007 | Brennan ............ 726/24 |
| 2007/0038677 | A1 | 2/2007 | Reasor et al. |
| 2007/0094269 | A1 | 4/2007 | Mikesell et al. |
| 2007/0240222 | A1 | 10/2007 | Tuvell et al. |
| 2008/0034268 | A1* | 2/2008 | Dodd et al. ............ 714/755 |
| 2008/0040388 | A1 | 2/2008 | Petri et al. |
| 2008/0147612 | A1 | 6/2008 | Gryaznov |
| 2008/0208935 | A1 | 8/2008 | Palliyil et al. |
| 2008/0216174 | A1 | 9/2008 | Vogel et al. |
| 2009/0064329 | A1 | 3/2009 | Okumura et al. |
| 2009/0210944 | A1 | 8/2009 | Greiner |

OTHER PUBLICATIONS

Leung et al. "Scalable Security for Petascale Parallel File Systems", ACM 2007.*

Leung et al., Scalable Security for Petascale Parallel File Systems; ACM 2007.*

* cited by examiner

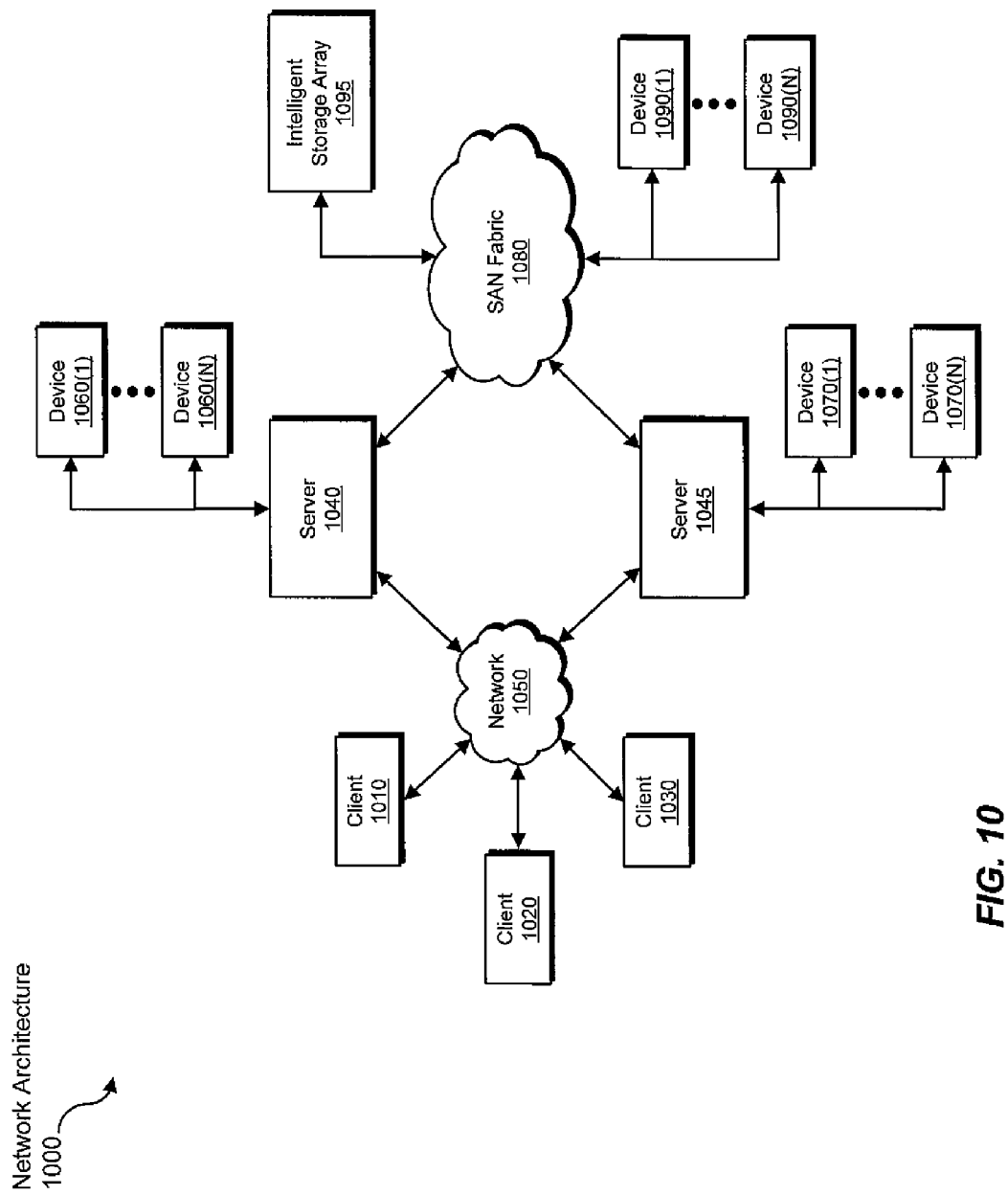

SYSTEMS AND METHODS FOR DETERMINING A FILE SET

BACKGROUND

Consumers and businesses increasingly rely on computers to store sensitive data. Consequently, malicious programmers seem to continually increase their efforts to gain illegitimate control and access to others' computers. Computer programmers with malicious motivations have created and continue to create viruses, Trojan horses, worms, and other programs meant to compromise computer systems and data belonging to other people. These malicious programs are often referred to as malware.

Security software companies are combating the growing tide of malware by creating and deploying malware signatures (e.g., hashes that identify malware) to their customers on a regular basis. For example, security software companies may send malware signature updates to their customers multiple times a day. By frequently updating malware signatures, security software companies may help their customers secure their computers against new and changing threats.

Each time a customer receives a malware definition update, the customer's computer may need to rescan numerous files to assure no malware is running on the computer. Consequently, customers' computers may take a performance hit each time they receive a malware signature update. Performance loss on customers' computers and networks increases as the size and frequency of signature updates increases. The performance loss may result in a negative customer experience.

Security software developers have tried to decrease the time and network traffic required to perform security scans by skipping known good files (e.g., files that are known to be free from malware). Before skipping a file, the security software typically must identify that the file is legitimate and free from malware. Security software developers have implemented at least two different methods to identify known good files to reduce security scan times.

In a first method, a client machine may keep a database of hashes of known good files. When performing a malware scan, the client machine may query the database to identify known good files. The client machine may then skip the known files, which may allow the scan to complete more quickly. However, maintaining a database of hashes of known good files may not be ideal. Maintaining the database may require frequent updates that increase network traffic. Also, the database may become large and may not provide the hoped-for efficiencies.

In a second method, a client machine may scan a drive. The client machine may compute hashes for the files stored on the drive and transmit the hashes to a server. The server may then determine if the hashes correspond to known good files. This technique also has drawbacks. Sending file hashes to a server may create unnecessary client-server communications and may consume too much network bandwidth.

CROSS REFERENCE TO RELATED APPLICATIONS

This disclosure is related to U.S. application Ser. No. 12/130,559, filed May 30, 2008, titled "Methods and Systems For Scanning Files For Malware", the disclosure of which is incorporated, in its entirety, by this reference.

SUMMARY

Embodiments of the instant disclosure are directed to increasing security scan speeds by skipping known good files. A security module on a client device may attempt to identify known good files on the client machine. In the process of identifying known good files, the security module may select a key file from a file set. The security module may identify or compute a key-file hash for the key file. The security module may send the key-file hash, rather than sending hashes for the entire file set, to a server. The server may use the key-file hash to identify a set of hashes associated with a set of known good files. The server may send the set of hashes to the client device, which may allow the security module to identify known good files on the client device. This technique may reduce the amount of network bandwidth consumed during a scan because the client, in determining whether the file set comprises known good files, may not need to send hashes for the entire file set to the server.

In some situations, the server may identify two or more sets of hashes that are associated with (e.g., include) the key-file hash. As will be described in greater detail below, the instant disclosure generally relates to systems and methods for handling the situation when a key-file hash from a client is associated with two or more sets of hashes on a server.

As previously mentioned, a client device may identify a file set. The client device may also calculate or identify a key-file identifier (e.g., a hash) for the key file and may transmit the key-file identifier to a server. After receiving the key-file identifier, the server may identify first and second file-identifier sets that include the key-file identifier. The server may be unable to determine whether the first or second file-identifier sets correspond to the file set on the client device. To determine which file set is on the client device, the server may select a first file identifier that is in the first file-identifier set but is not in the second file-identifier set. The server may also select a second file identifier that is in the second file-identifier set but not in the first file-identifier set.

In other words, the server may select file identifiers that do not exist in the intersection of the first and second file-identifier sets. An intersection of the first and second file-identifier sets may be a set of file identifiers that contain all the file identifiers that exist in both the first and second file-identifier sets. By selecting first and second file identifiers that are not in the intersection of the first and second file-identifier sets, the server may be able to determine which file set is on the client device.

To determine which file set is on the client device, the server may transmit the first and second file identifiers to the client device. After receiving the first and second file identifiers, the client device may determine whether the first or second file identifiers are in the file set. For example, the client device may determine that the file set includes the second file identifier. The client device may tell the server that the file set includes the second file identifier, and the server may respond by sending the second set of file identifiers to the client device. A security module on the client device may perform a security scan of files on the client device, and the client device may skip files identified by the second set of file identifiers.

In some embodiments, the client device and the server may engage in an iterative communication process to determine which file set actually resides on the client device. According to at least one embodiment, the client device may send sets of key file identifiers to the server in the process of determining which set of known good files the client may comprise. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 is a block diagram of an exemplary computing network capable of implementing one or more of the embodiments described and/or illustrated herein.

Figure 1:
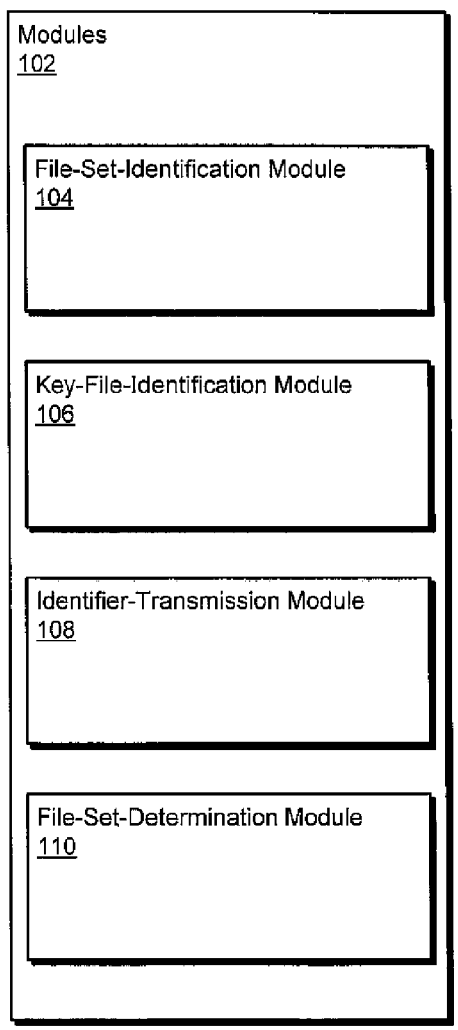
FIG. 1 is a block diagram of an exemplary system for determining a file set according to at least one embodiment.
Figure 1:
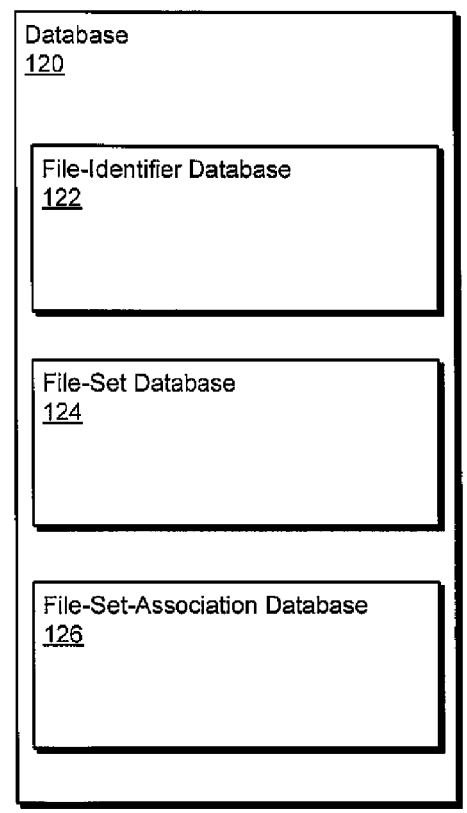

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using key files to determine which set of files a computing device may include. As detailed below, in certain embodiments a computing system may determine a file set by communicating file identifiers between first and second computing systems. The following will provide, with reference to FIGS. 1 and 2, detailed descriptions of exemplary systems for determining a file set. An illustration of the manner in which information may be communicated between a first and second computing device is provided in FIGS. 4 and 6. Detailed descriptions of corresponding exemplary computer-implemented methods will also be provided in connection with FIGS. 3, 5, 7, and 8.

FIG. 1 is a block diagram of an exemplary system 100 for a file set. As illustrated in this figure, exemplary system 100 may comprise one or more modules 102 for performing one or more tasks. For example, exemplary system 100 may comprise a file-set-identification module 104 for identifying a file set on a computing device and a key-file-identification module 106 for identifying a key-file contained within the file set.

Exemplary system 100 in FIG. 1 may also comprise an identifier-transmission module 108 for assigning identifiers to files and transmitting file identifiers between first and second computing systems. In addition, as will be described in greater detail below, exemplary system 100 may comprise a file-set-determination module 110 for determining which file set is represented by certain file identifiers.

As illustrated in FIG. 1, exemplary system 100 may also comprise one or more databases 120. For example, exemplary system 100 may comprise a file-identifier database 122 for storing information that may be used to identify specific files. Exemplary system 100 may also comprise a file-set database 124 for storing information that may be used to identify specific file sets. In addition, exemplary system 100 may comprise a file-set-association database 126 that may contain data that associates the file identifier information in file-identifier database 124 with the file-set information in file-set database 124. Although illustrated as separate devices, one or more of databases 120 may represent portions of a single database or a single computing device.

In certain embodiments, one or more of modules 102 in FIG. 1 may represent one or more software applications or programs that, when executed by a computing device, may cause the computing device to perform one or more tasks required to determine a file set. For example, as will be described in greater detail below, one or more of modules 102 may represent software modules configured to run on one or more computing devices, such as client 202 in FIG. 2, server 206, computing system 910 in FIG. 9, and/or portions of exemplary network architecture 1000 in FIG. 10. One or more modules 102 in FIG. 1 may also represent all or portions of one or more special-purpose computers configured to perform one or more tasks required to determine a file set.

In addition, one or more of databases 120 in FIG. 1 may represent a portion of one or more computing devices. For example, one or more of databases 120 may represent a portion of client 202 in FIG. 2, server 206 in FIG. 2, exemplary computing system 910 in FIG. 9, and/or portions of exemplary network architecture 1000 in FIG. 10. Alternatively, one or more of databases 120 in FIG. 1 may represent one or more physically separate devices capable of being accessed by a computing device, such as client 202 in FIG. 2, server 206, computing system 910 in FIG. 9, and/or portions of exemplary network architecture 1000 in FIG. 10.

Figure 2:
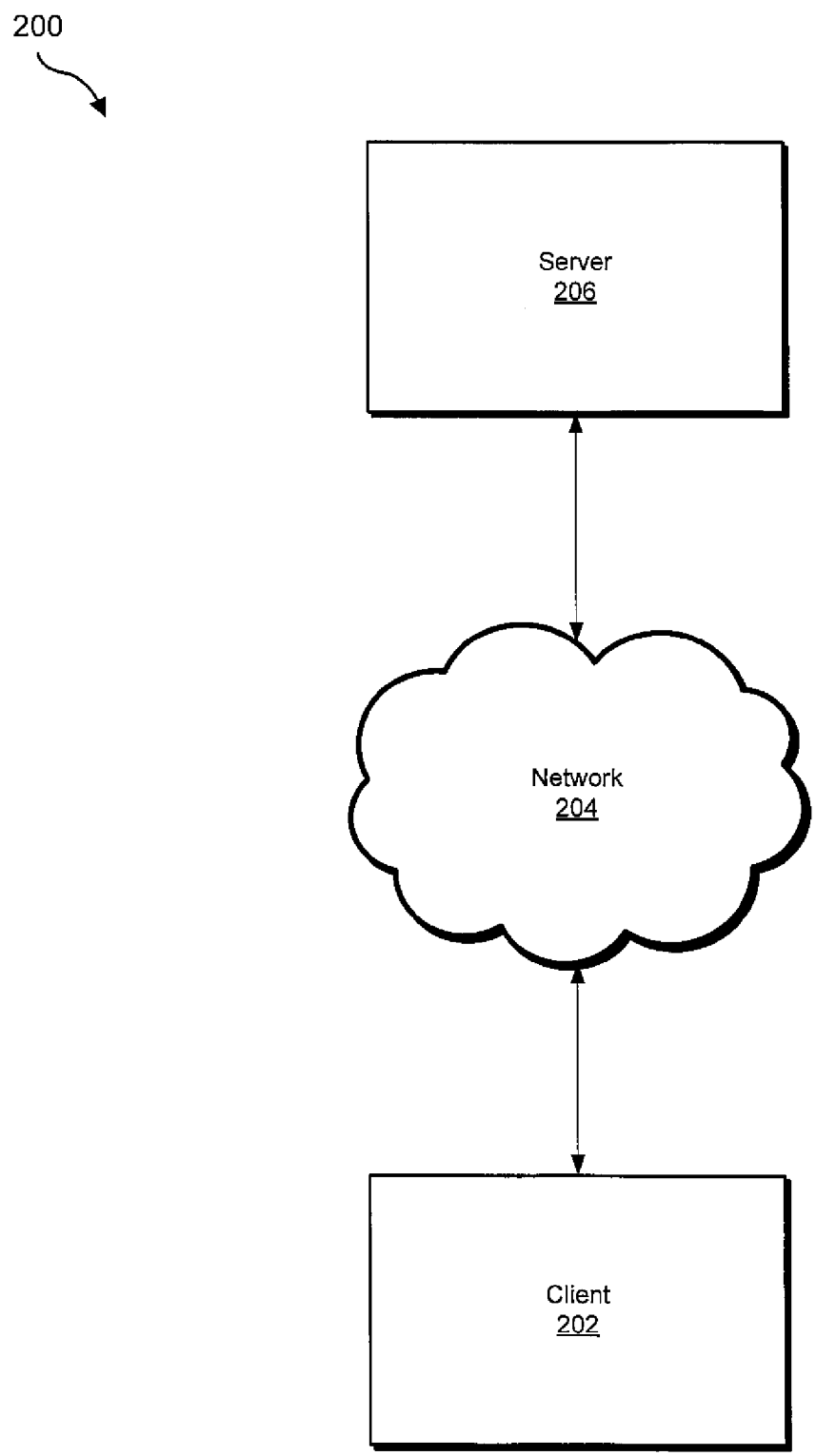
FIG. 2 is a block diagram of an exemplary network-based system for determining a file set according to at least one embodiment.

Client 202 in FIG. 2 generally represents any type or form of client-side computing device capable of executing computer-readable instructions. In certain embodiments, client 202 may comprise one or more portions of exemplary system 100 in FIG. 1. For example, one or more of modules 102 may be stored and configured to run on client 202 in FIG. 2. Similarly, one or more of databases 120 in FIG. 1 may represent portions of client 202 in FIG. 2.

In at least one embodiment, client 202 in FIG. 2 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a back-end. In certain embodiments, server 206 may comprise one or more portions of exemplary system 100 in FIG. 1. For example, one or more of modules 102 from FIG. 1 may be stored and configured to run on server 206 in FIG. 2. Similarly, server 206 may comprise one or more of databases 120 in FIG. 1.

Figure 3:
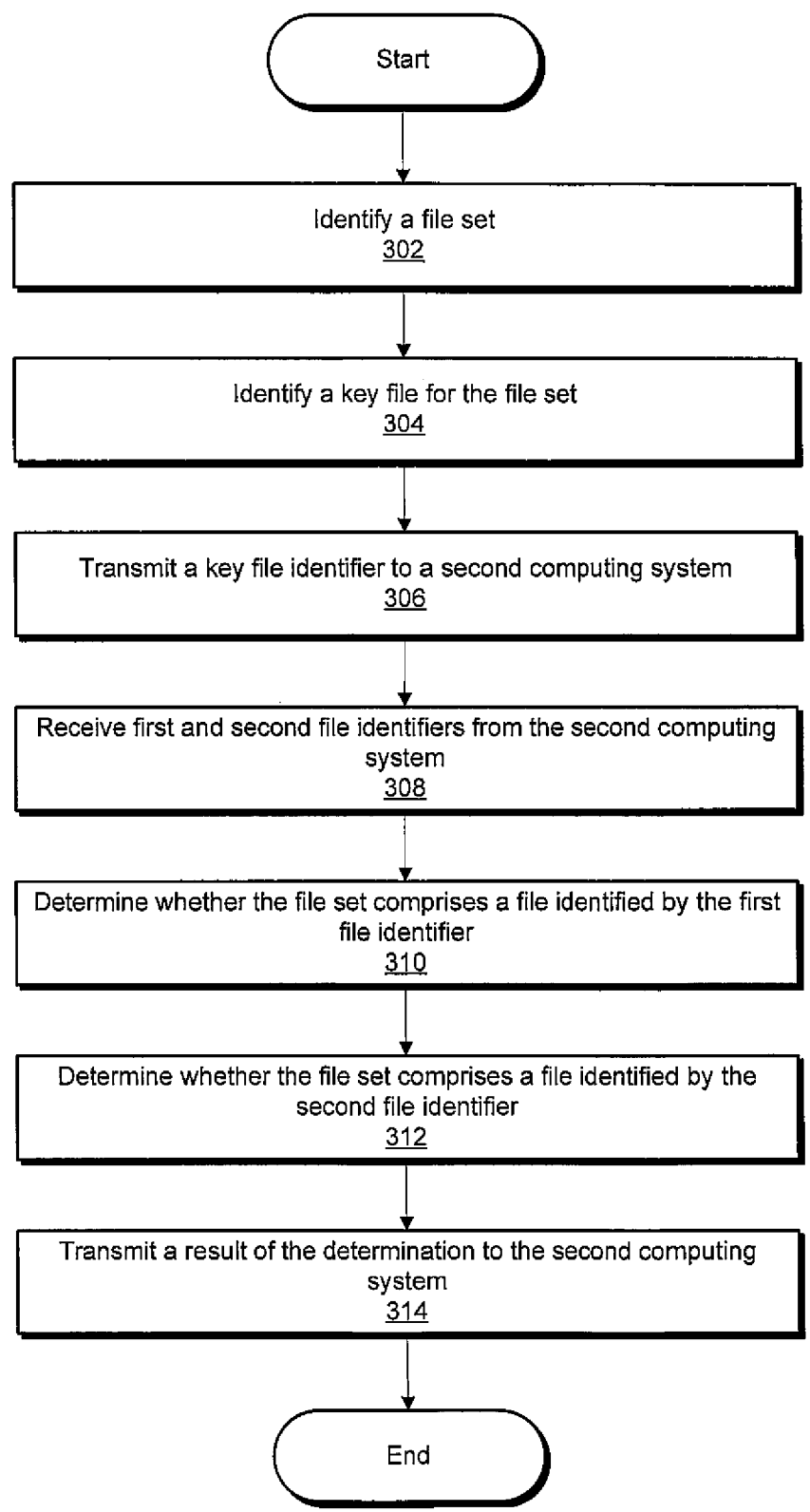
FIG. 3 is a flow diagram of an exemplary computer-implemented method for determining a file set according to at least one embodiment.

FIG. 3 is a flow diagram of an exemplary computer-implemented method 300 for determining a file set. As illustrated in this figure, at step 302 a file set may be identified. For example, file-set-identification module 104 in FIG. 1 may identify a file set that is stored on client 202 in FIG. 2. The phrase "file set," as used herein, generally refers to a group of files stored on a storage device in a computing system. A file set may comprise a file directory, a subset of files within a file directory, files associated with a computer program, and/or any plurality of files contained on a file storage device.

A file set that is stored on a computing system may be identified in a variety of ways. For example, file-set-identification module 104 in FIG. 1 may identify file sets at the time of installation by grouping files that were installed by the same installation program. In another example, file-set-identification module 104 may identify file sets at the time the computing system attempts to scan files. In this example, client 202 in FIG. 2 may select file sets by file directory. In a further example, file-set-identification module 104 in FIG. 1 may select random files on the storage device to constitute a file set at the time the computing system attempts to scan files.

At step 304 in FIG. 3, a key file for the file set may be identified. For example, key-file-identification module 106 in FIG. 1 may identify a key-file contained in the file set identified by file-set-identification module 104 on client 202 in FIG. 2. The phrase "key-file," as used herein, generally refers to a file contained within a file set on a computing device. A key file on a first computing device may be selected to indicate to a second computing device that a specific file set is stored in the first computing device. For example, file-set-identification module 104 in FIG. 1 on client 202 in FIG. 2 may select a file set represented by the directory "C:\program files\syfin\." Key-file-identification module 106 in FIG. 1 may identify the key file as "syfin.rsb". Key file "syfin.rsb" may then represent all the files contained within "C:\program files\syfin\."

In certain embodiments, identifying a key file may comprise randomly selecting a file contained in a file set to represent the file set. In another embodiment, certain methods may be used in selecting a key file from within a file set. For example, key-file-identification module 106 in FIG. 1 may select a key file because it is contained in the file set identified by file-set-identification module 104, and is not associated with any other file sets stored on the computing device. In another example, key-file-identification module 106 may be instructed to designate a particular file as the key file for a file set at the time the file set is installed.

In at least one embodiment, identifying a key file in step 302 in FIG. 3 may comprise selecting a group of files contained in the file set stored in the computing device. The file set may be identified by file-set-identification module 104 in FIG. 1. For example, key-file-identification module 106 may randomly select a plurality of files from within the file set to constitute the set of key files. In another example, key-file-identification module 106 may use one or more rules to identify a set of key files by selecting a plurality of files from within the file set.

At step 306 in FIG. 3, a key-file identifier for the key file selected in step 304 may be transmitted to a second computing system. For example, identifier-transmission module 108 in FIG. 1 on client 202 in FIG. 2 may transmit the key-file identifier to server 206. The phrase "key-file identifier," as used herein, generally refers to any information associated with a key file that identifies the key file. For example, a key-file identifier for a key file may comprise, without limitation, one or more of the following: a file name of the key file, a version number of the key file, a hash of the key file, the size of the key file, a directory where the key file is stored on a computing device, and a system identifier for the computing system. Before transmitting the key file identifier to the second computing system, the first computing system may identify, compute, or otherwise create the key file identifier. For example, the first computing device may compute the key file identifier by computing a hash for the selected key file.

Figure 4:
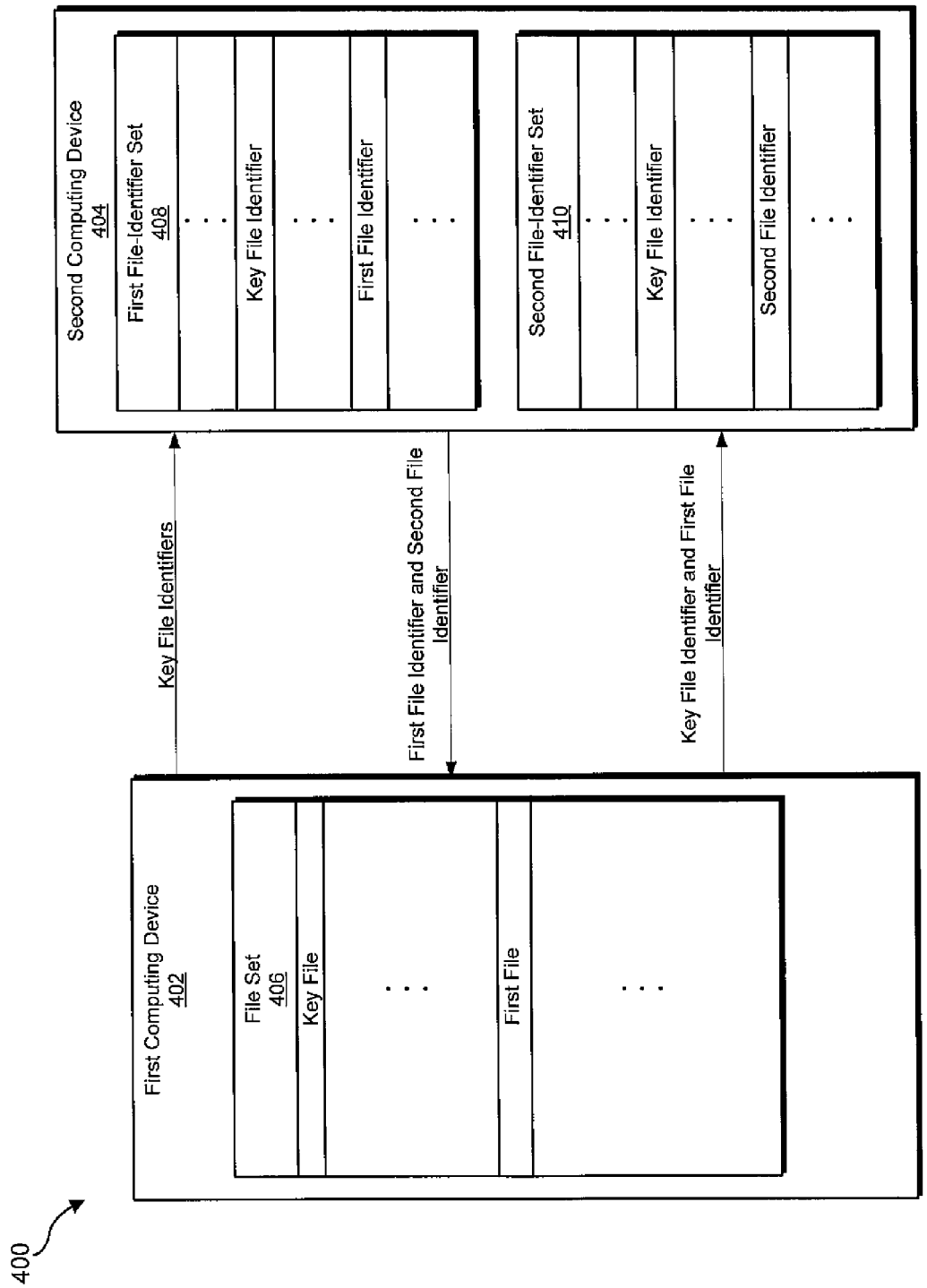
FIG. 4 is a block diagram illustrating communications between first and second computing systems when determining a file set according to at least one embodiment.

In certain embodiments, identifier-transmission module 108 in FIG. 1 on client 202 in FIG. 2 may transmit a key-file identifier to server 206 as illustrated in FIG. 4. The key-file identifier may be associated with (e.g., may represent) the key file identified by key-file-identification module 106 in FIG. 1. FIG. 4 illustrates an exemplary communication sequence 400 between first and second computing devices. As illustrated in FIG. 4, file-set-identification module 104 in FIG. 1 on first computing device 402 in FIG. 4 may identify file set 406. Key-file-identification module 106 in FIG. 1 may identify the key file contained in file set 406 in FIG. 4. Then, identifier-transmission module 108 in FIG. 1 on first computing device 402 in FIG. 4 may transmit a key-file identifier of the key file contained within file set 406 to second computing device 404.

Figure 6:
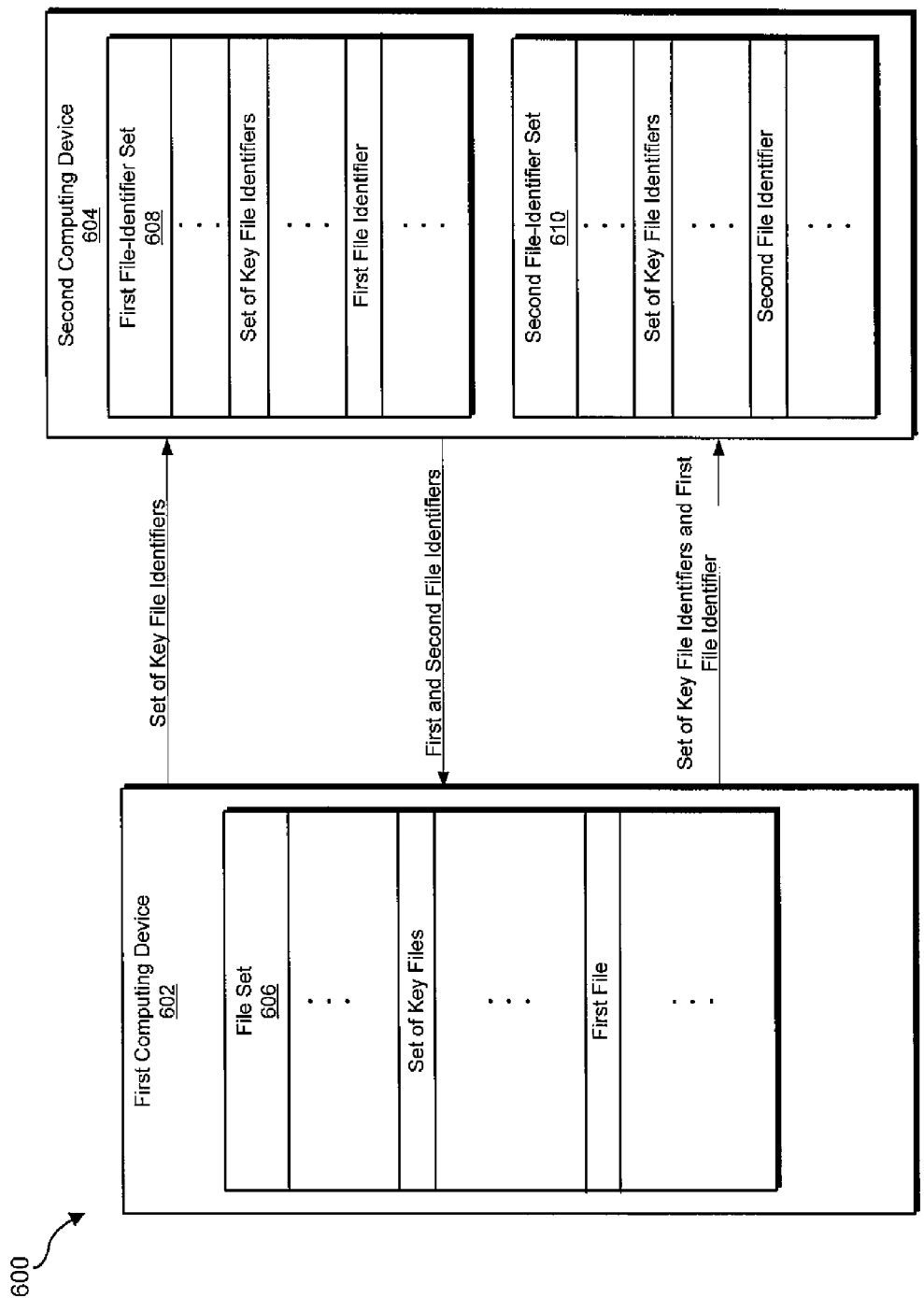
FIG. 6 is a block diagram illustrating communications between first and second computing systems when determining a file set according to at least one embodiment.

In another embodiment, identifier-transmission module 108 in FIG. 1 on client 202 in FIG. 2 may transmit a set of key-file identifiers to server 206, as illustrated in FIG. 6. The set of key-file identifiers may be associated with a set of key-files identified by key-file-identification module 106 in FIG. 1. FIG. 6 illustrates an exemplary communication sequence between first and second computing device. As illustrated in FIG. 6, file-set-identification module 104 in FIG. 1 on first computing device 602 in FIG. 6 may identify file set 606. Key-file-identification module 106 in FIG. 1 may identify the set of key files contained in file set 606 in FIG. 6. Then, identifier-transmission module 108 in FIG. 1 on first computing device 602 in FIG. 6 may transmit a set of key-file identifiers of the set of key files contained within file set 606 to second computing device 604.

At step 308 in FIG. 3, first and second file identifiers may be received from a second computing system. For example, identifier-transmission module 108 in FIG. 1 on client 202 in FIG. 2 may receive first and second file identifiers from server 206. The phrases "first file identifier" and "second file identifier," as used herein, generally refer to any information associated with a file that may be used to identify a file on multiple computing devices. The first file identifier may be associated with (e.g., found in) a first file-identifier set, the second file identifier may be associated with a second file-identifier set, and the key-file identifier may be associated with both the first file-identifier set and second file-identifier set.

The phrase "file-identifier set," as used herein, generally refers to a set of file identifiers. The file identifiers may correspond to files contained in a file set. For example, a file-identifier set on server 206 in FIG. 2 may contain file identifiers for all the files in a file set residing on client 202.

In certain embodiments, server 206 may identify a first and a second file-identifier sets that include the key-file identifier. Server 206 may be unable to determine whether the first or second file-identifiers sets corresponds to the file set on the client device. To determine which file set is on client 202, server 206 may select a first file identifier that is in the first file identifier set but is not in the second file-identifier set. Server 206 may also select a second file identifier that is in the second file-identifier set but not in the first file-identifier set.

For example, server 206 may select file identifiers that do not exist in the intersection of the first and second file-identifier sets. An intersection of the first and second file-identifier sets may be a set of file identifiers that contains all the file identifiers that exist in both the first and second file-identifier sets. By selecting first and second file identifiers that are not in the intersection of the first and second file-identifier sets, the server may be able to determine which file set is on the client device.

In certain embodiments, server 206 may transmit the first and second file identifiers to the client device. For example, identifier-transmission module 108 in FIG. 1 on server 206 in FIG. 2 may transmit first and second file identifiers to client 202. FIGS. 4 and 6 provide an exemplary illustration of the reception of first and second file identifiers on a first computing device. In FIG. 4, first computing device 402 may receive first and second file identifiers from second computing device 404. The first file identifier may identify a file in first file-identifier set 408, and the second file identifier may identify a file in second file-identifier set 410. In FIG. 6, first computing device 602 may receive first and second file identifiers from second computing device 604, the first file identifier identifying a file in first file-identifier set 608 and the second file identifier identifying a file in second file-identifier set 610.

In certain embodiments, identifier-transmission module 108 in FIG. 1 on client 202 in FIG. 2, instead of receiving only first and second file identifiers, may receive first and second subsets of file identifiers. The first subset of file identifiers may comprise a subset of identifiers from first file-identifier set 608, and the second subset of file identifiers may comprise a subset of identifiers from second file identifier set 610. The first subset of file identifiers may comprise file identifiers that are not found in second file identifier set 610, and the second subset of file identifiers may comprise file identifiers that are not found in first file identifier set 608.

In another embodiment, second computing device 604 may identify more than two file-identifier sets that include the key-file identifier. In such embodiments, identifier-transmission module 108 in FIG. 1 on client 202 in FIG. 2 may receive a plurality of file-identifiers from server 206. Each file identifier may be from a different file-identifier set. Furthermore, each file identifier in the plurality of file identifiers may not be found in an intersection of two or more of any of the different file-identifier sets.

If server 206 is able to determine which set of file identifiers is associated with the file set on client 202, server 206 may transmit the set of file identifiers to client 202. If server 206 is unable to determine which file set is located on client 202, server 206 may send two or more file identifiers to client 202, as previously mentioned. Next, client 202 may determine whether the file set on client 202 includes any of the identifiers sent from server 206. For example, at step 310 in FIG. 3, whether the file set comprises a file identified by the first file identifier may be determined. For example, file-set-determination module 110 in FIG. 1 on client 202 in FIG. 2 may determine whether the file-set identified by file-set-identification module 104 in FIG. 1 contains the file associated with the first file identifier received by identifier-transmission module 108 from server 206 in FIG. 2. In one embodiment, FIGS. 4 and 6 illustrate that file sets 406 and 606 contain the first file identified by the first file identifier.

At step 312 in FIG. 3, whether the file set comprises a file identified by the second file identifier may be determined. For example, file-set-determination module 110 in FIG. 1 on client 202, in FIG. 2 may determine whether the file-set identified by file-set-identification module 104 in FIG. 1 contains the file associated with the second file identifier received by identifier-transmission module 108 in FIG. 1 from server 206 in FIG. 2. In one embodiment, FIGS. 4 and 6 show that file sets 406 and 606 do not contain the second file identified by the second file identifier.

In certain embodiments, determining whether the file set may comprise the first or second file identifiers can be extended to determining whether the file set comprises more than two identifiers. For example, identifier-transmission module 108 in FIG. 1 on client 202 in FIG. 2 may receive a plurality of file identifiers from server 206. File-set-determination module 110 in FIG. 1 may determine if the files associated with the plurality of file identifiers are contained within the file set identified by file-set-identification module 104 on client 202 in FIG. 2.

At step 314 in FIG. 3, the first computing system may transmit a result of one or more of the determination steps (e.g., steps 310 and 312) to the second computing system. For example, client 202 in FIG. 2 may transmit the result of the determination to server 206. The result may be the result of the determination of whether the file set contained the files associated with the first and second file identifiers. The term "result," as used herein, generally refers to an outcome of a comparison between the data received from the second computing system and information contained in the file set on the first computing system. For example, the result may contain a system identifier for the first computing system, the key-file identifier, the first file identifier, the second file identifier, and/or any other suitable indication of an outcome of a determination.

In certain embodiments, the result transmitted from client 202 in FIG. 2 to server 206 may provide information that enables server 206 to identify the file set on client 202. For example, in FIG. 4, file-set-determination module 110 in FIG. 1 on first computing device 402 in FIG. 4 may determine that file set 406 contains a file associated with the first file identifier. First computing device 402 may transmit the first file identifier and the key-file identifier to second computing device 404. Second computing device 404 may then determine that the file set on computing device 402 is file set 406 (rather than some other file set). In another example, as shown in FIG. 6, file-set-determination module 110 in FIG. 1 on first computing system 602 in FIG. 6 may determine that file set 606 contains the file associated with the first file identifier. First computing system 602 may transmit the first file identifier and the set of key-file identifiers to second computing system 604. Second computing system 604 may then determine that the file set on first computing system 602 is file set 606.

In embodiments where the server identifies more than two file sets associated with the key file, the result transmitted from client 202 in FIG. 2 to server 206 may provide information that enables server 206 to identify the file set on client 202. For example, file-set determination module 110 in FIG. 1 on client 202 may identify at least one file identifier contained in the file set. Client 202 may then transmit the file identifiers associated with files from the file set and the key-file identifier to the server 206. If client 202 returns two or more file identifiers to server 206, server 206 may need to select new file identifiers to send to client 202 to determine which file set is on client 202, as discussed with respect to FIGS. 7 and 8.

Computer-implemented method 300 in FIG. 3 shows steps that may be performed on, by, or on behalf of a first computing system. As discussed, the first computing system (e.g., a client) may transmit information to and receive information from a second computing system (e.g., a server). Computer-implemented method 500 in FIG. 5 shows steps that may be performed on, by, or on behalf of the second computing system.

Figure 5:
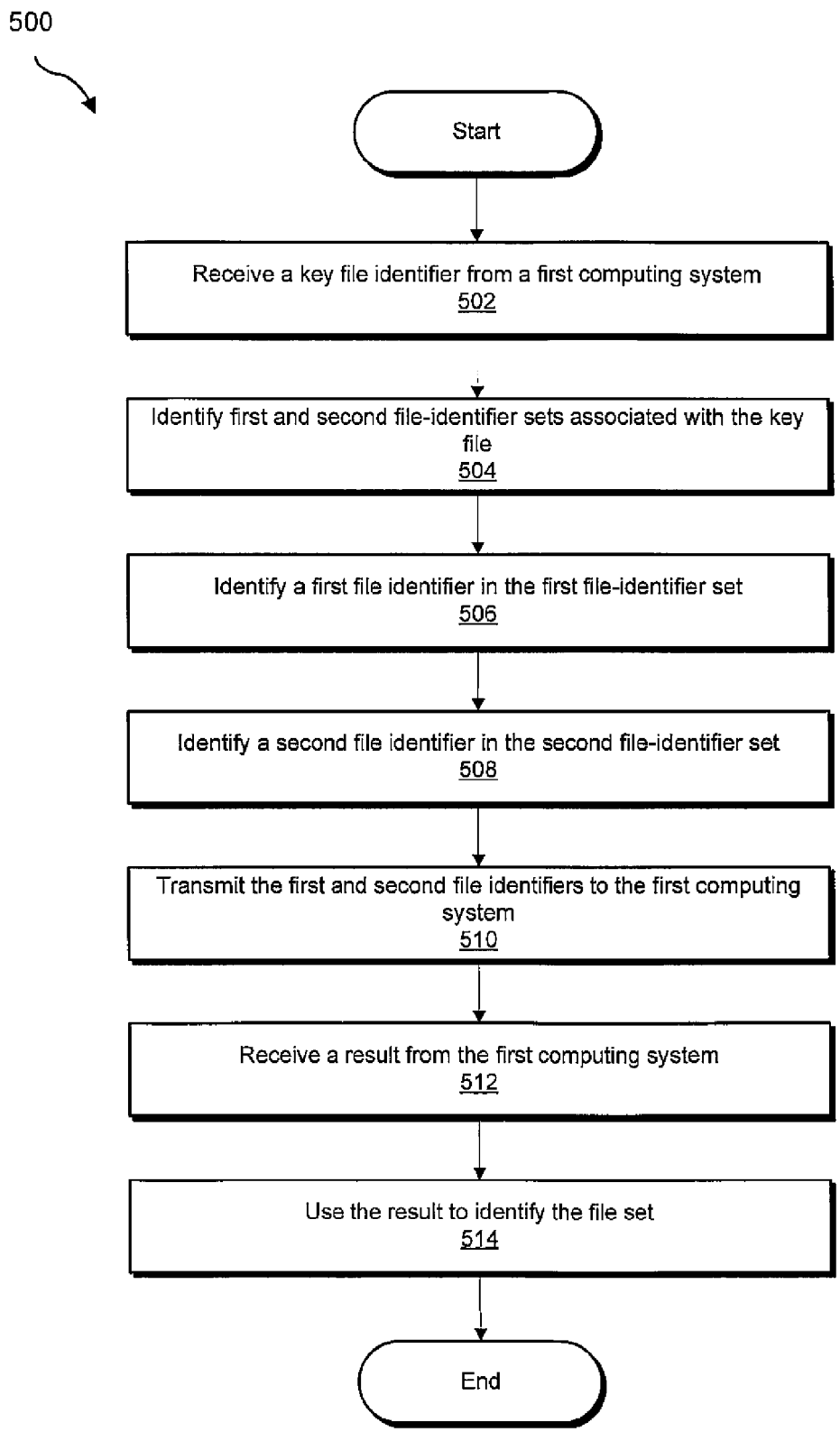
FIG. 5 is a flow diagram of an exemplary computer-implemented system for determining a file set through an iterative process according to at least one embodiment.

At step 502 in FIG. 5, a key file identifier may be received from a first computing system. For example, identifier-transmission module 106 in FIG. 1 on server 206 in FIG. 2 may receive a key-file identifier from client 202. In certain embodiments, identifier-transmission module 106 in FIG. 1 on server 206 in FIG. 2 may receive a set of key-file identifiers from client 202.

At step 504 in FIG. 5, first and second file-identifier sets associated with the key file may be identified. For example, file-set-identification module 104 in FIG. 1 on server 206 in FIG. 2 may identify first and second file-identifier sets associated with the key-file. File-set-identification module 105 may identify first and second file-identifiers sets by finding file-identifier sets that contain the key-file identifier. In other embodiments, file-set-identification module 105 may identify first and second file-identifier sets by finding file-identifier sets that contain a file identifier associated with or related to the key-file identifier. A file identifier may be associated with a key-file identifier if both the file identifier and the key-file identifier identify the same file.

In certain embodiments, the file-identifier sets may be stored in a file-set database. The phrase "file-set database," as used herein, generally refers to a database on a computing system that contains information that associates file-sets with file identifiers. For example, a file-set database on server 206 may comprise, as file identifiers, a table of file names, a table of file versions, a table of file hashes, and/or a table of file directories. The file-set database on server 206 may also comprise a table of file sets. The file set database may use a table of associations of files to file sets to link the file identifiers to the table of file sets.

In some embodiments, server 206 may search the file-set database for all file-identifier sets associated with the key-file identifier. In embodiments where server 206 receives a set of key-file identifiers, file-set-identification module 104 in FIG. 1 on server 206 in FIG. 2 may identify the file-identifier sets that include all file identifiers in the set of key-file identifiers. Alternatively, file-set-identification module 104 on server 206 may identify the file-identifier sets that include at least one file identifier in the set of key-file identifiers.

At step 506 in FIG. 5, a first file identifier in the first file-identifier set may be identified. For example, server 206 in FIG. 2 may identify a first file identifier in the first file-identifier set. At step 508 in FIG. 5, a second file identifier in the second file-identifier set may be identified. For example, server 206 in FIG. 2 may identify a second file identifier in the second file-identifier set.

In certain embodiments, server 206 may select the first file identifier in the first file-identifier set because the first file identifier is not contained in the second file-identifier set. Also, server 206 may select the second file identifier in the second file-identifier set because the second file identifier is not contained in the first file-identifier set.

FIG. 4 illustrates the selection of the first and second file identifiers. In FIG. 4, second computing device 404 may identify first file-identifier set 408 and second file identifier set 410 by using the key-file identifier received from the first computing device 402. The first file identifier is in the first file-identifier set 408 and is not in the second file-identifier set 410. The second file identifier is in the second file-identifier set 410 and is not in the first file-identifier set 408.

In at least one embodiment, server 206 in FIG. 2 may select file identifiers that distinguish a plurality of file-identifier sets, such that no file-identifier set includes more than one file-identifier. Server 206 may randomly select a file identifier for a file-identifier set that is not contained in the intersection of the different file-identifier sets associated with the key-file identifier. In a further example, server 206 may randomly select a plurality of file identifiers for a file-identifier set, wherein the plurality of file identifiers is not contained in the intersection of any two of the file-identifier sets associated with the key-file identifier.

At step 510 in FIG. 5, first and second file identifiers may be transmitted to the first computing system. For example, identifier-transmission module 108 in FIG. 1 on server 206 in FIG. 2 may transmit the first and second file identifiers, identified in steps 506 and 508 of FIG. 5, to client 202 in FIG. 2. In another example, identifier-transmission module 108 in FIG. 1 on server 206 in FIG. 2 may transmit a plurality of file identifiers to client 202. In a further example, identifier-transmission module 108 in FIG. 1 on server 206 in FIG. 2 may transmit the key-file identifier and the first and second file identifiers to client 202. Also, identifier transmission module 108 in FIG. 1 on server 206 in FIG. 2 may transmit only the key-file identifier to client 202.

At step 512 in FIG. 5, a result may be received from the first computing system. For example, server 206 in FIG. 2 may receive the result of a comparison between the file set and the first and second file identifiers from client 202. In FIG. 4, second computing device 404 may receives a result containing the key file identifier and the first file identifier from first computing device 402. The response from first computing device 402 may provide second computing device 404 with the information needed to identify the file set on first computing device 402.

At step 514 in FIG. 5, the result may be used to identify the file set. For example, file-set-determination module 110 on server 206 in FIG. 2 may use the information provided in the result to identify the file set stored on client 202. In FIG. 4, second computing device 404 may receive a result containing the key-file identifier and the first file identifier. Second computing device 404 may then identify the file-identifier sets containing all the file identifiers received in the result.

In embodiments where a server sends subsets of file-identifier sets to a client, the client may reply by sending a result that contains a portion of a file-identifier subset. The server may determine whether the portion of file-identifiers comprises a predetermined number of file identifiers. For example, the server may determine whether the portion of file-identifiers comprises a predetermined percentage of file identifiers in a file-identifier set or subset. If the portion of file-identifiers comprises at least the predetermined number of file identifiers, the server may determine that the file-identifier set that contains the portion of file-identifiers is associated with the file set on the client. Various other heuristics and algorithms may be used to determine which file set is on the client.

As shown in FIG. 4, the result may comprise the key-file identifier and the first file identifier. File-set-determination module 110 in FIG. 1 may determine that first computing device 402 contains the file set 406. File identifiers in file-identifier set 408 may represent the files in file set 406. Thus, file-set-determination module 110 may determine that first computing device 402 contains file set 406 by determining that the received result contains the first file identifier. Since first file-identifier set 408 is the only file-identifier set that contains the first file identifier, file-set-determination module 110 may determine that the file set on computing device 402 is associated with file-identifier set 408.

After a server determines which set of file-identifiers are associated with the file set on a client, a scanning module may use this information to increase scan speeds by skipping the files identified in the file set. In embodiments where the scanning module is located on the client, the server may send the set of file identifiers to the client. The scanning module on the client may use the set of file identifiers to determine which files on the client may be skipped.

Figure 7:
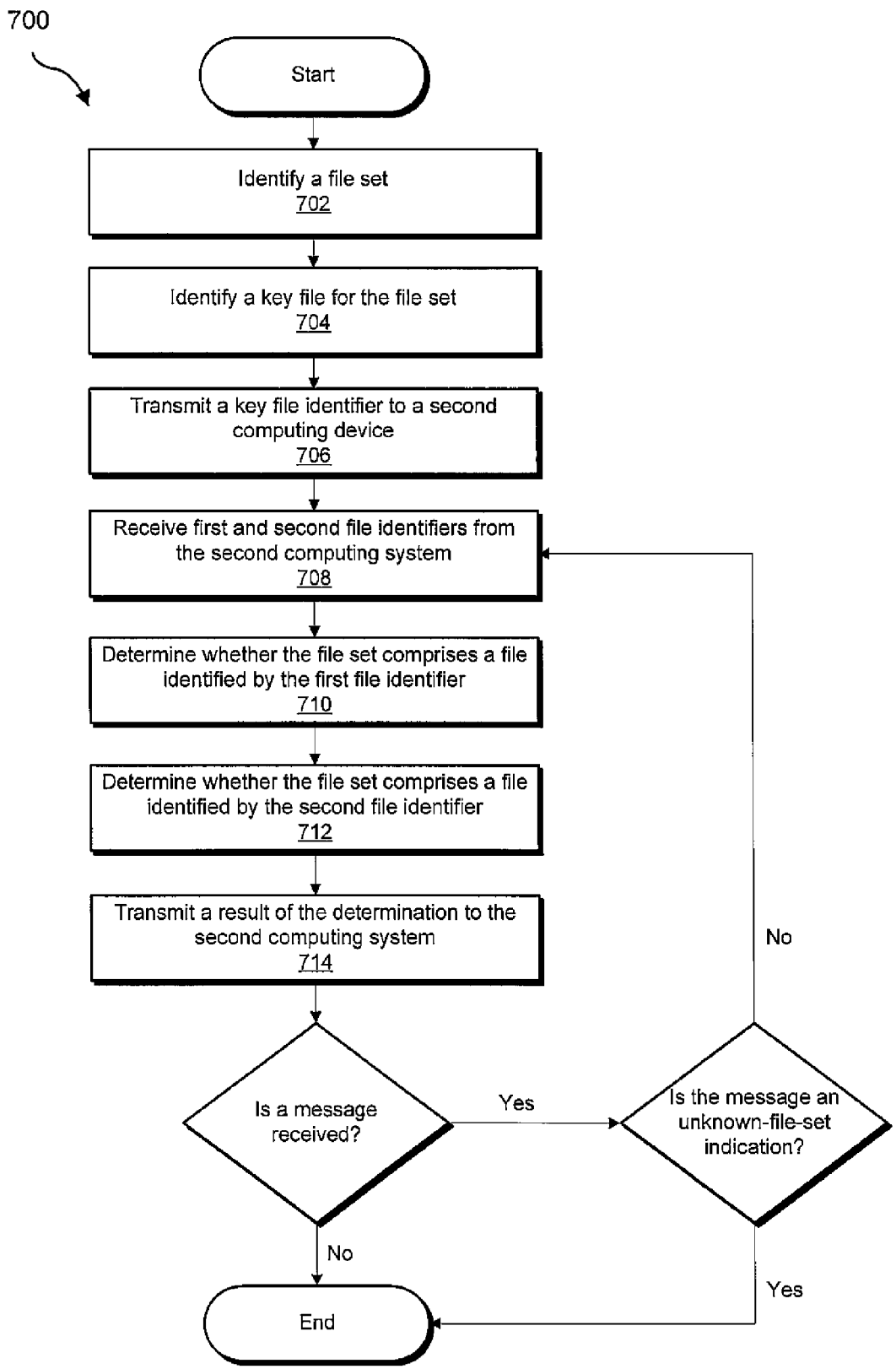
FIG. 7 is a flow diagram of an exemplary computer-implemented method for determining a file set according to at least one embodiment.
Figure 8:
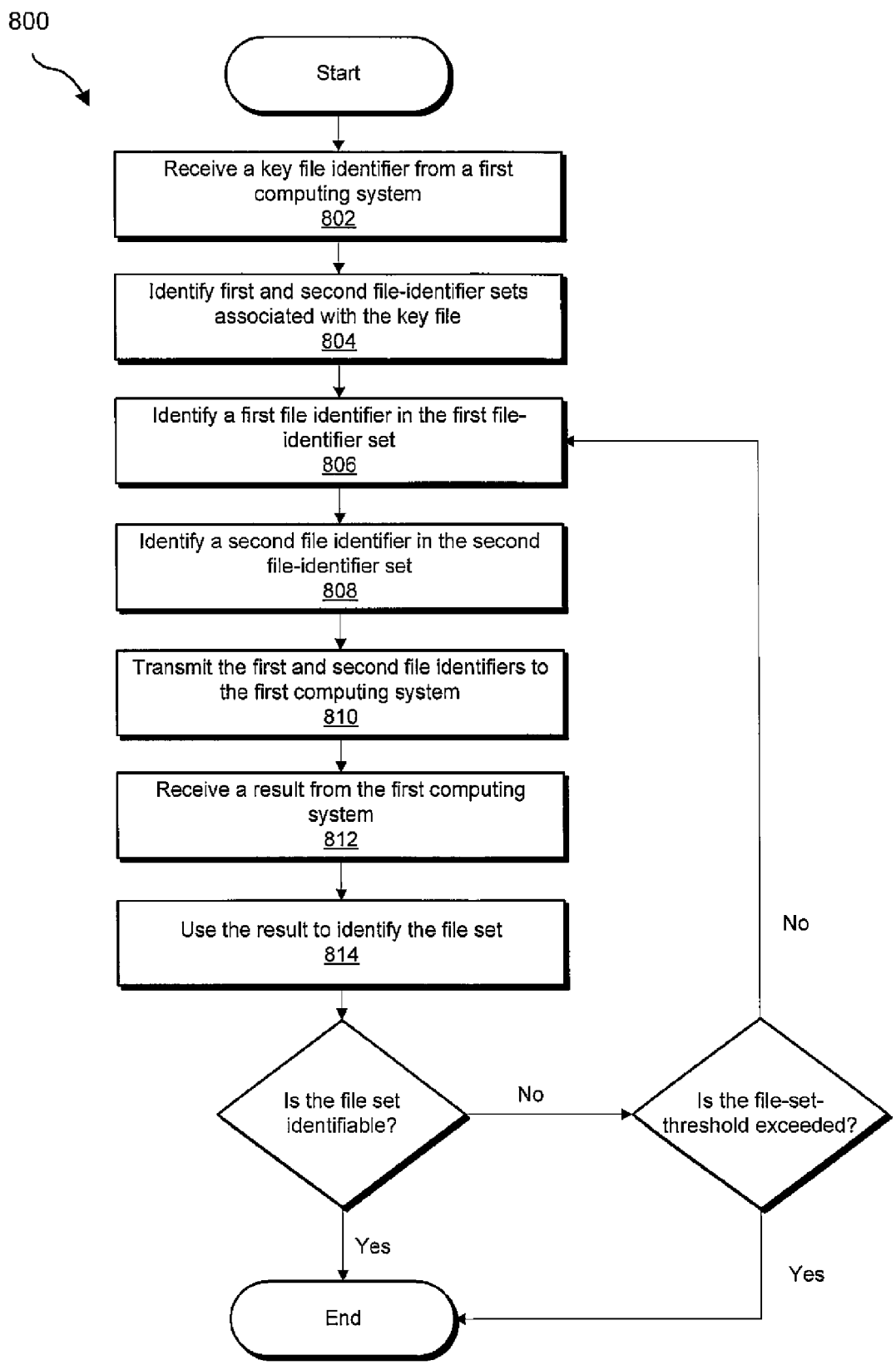
FIG. 8 is a flow diagram of an exemplary computer-implemented method for determining a file set through an iterative process according to at least one embodiment.

Computer-implemented methods 700 in FIG. 7 and 800 in FIG. 8 describe an iterative method for determining a file set. FIG. 7 is a flow diagram of computer-implemented method 700 for iteratively determining a file set on a first-computing device. Steps 702, 704, and 706 are identical to steps 302, 304, and 306 in FIG. 3.

At step 708 in FIG. 7, first and second file identifiers may be received. For example, identifier-transmission module 108 in FIG. 1 on client 202 in FIG. 2 may receive first and second file identifiers from server 206. In certain embodiments, client 202 may repeat step 708 in FIG. 7 until server 206 determines which file set is on client 202 (e.g., until client 202 in FIG. 2 stops receiving file identifiers from server 206). In one embodiment, during each iteration client 202 may receive at least one new file identifier in addition to receiving all the file identifiers sent from server 206 during previous iterations.

In another embodiment, during each iteration client 202 may receive only the file-identifiers that are necessary for server 206 to identify the file set on client 202. For example, even though server 206 may be unable to identify exactly which file-identifier set is associated with the file set on client 202, server 206 may determine that one or more file-identifier sets associated with the key-file identifier are not associated with the file set on client 202. In such embodiments, server 206 may not send file identifiers from the unassociated file-identifier sets in subsequent iterations.

As part of the iterative loop shown in FIG. 7, client 202 may repeat steps 710 and 712 in FIG. 7, which are identical to steps 310 and 312 in FIG. 3, until the iteration process terminates. At step 714 in FIG. 7, a result of the determination may be transmitted to the second computing system. For example, file-set-determination module 110 in FIG. 1 on client 202 in FIG. 2 may transmit the file identifiers (i.e., the file identifier received from server 206) associated with files in the file set. The result may comprise all identifiers that have been transmitted between client 202 and server 206 that are associated with the file set and all file identifiers that have been received by client 202.

In certain embodiments, computer-implemented method 700 in FIG. 7 may return to step 708 if server 206 in FIG. 2 is unable to determine the set from the result. Client 202 may receive new sets of file identifiers every iteration, and client 202 may compare these file identifiers with the file set until server 206 determines that the file set is not identifiable by server 206. In one embodiment, client 202 may receive an indication that the file set is an unknown file set. Upon receiving an unknown-file-set indication method 700 in FIG. 7 may terminate. Method 700 may also terminate when client 202 in FIG. 2 does not receive any more messages from server 206.

In other embodiments, method 700 in FIG. 7 may terminate when client 202 in FIG. 2 receives an indication that the file set has been identified by server 206. Server 206 may tell client 202 that the file set has been identified in a variety of ways. For example, server 206 may send client 202 the set of file identifiers that corresponds to the file set on the client 202. In other embodiments, server 206 may send client 202 file identifiers that are identical to the file identifiers that were transmitted by client 202 to server 206.

Computer-implemented method 700 in FIG. 7 shows steps that may be performed on, by, or on behalf of a first computing system. As discussed, the first computing system (e.g., a client) may transmit information to and receive information from a second computing system (e.g., a server). Computer-implemented method 800 in FIG. 8 shows steps that may be performed on, by, or on behalf of the second computing system. Steps 802 and 804 are identical to steps 502 and 504 in FIG. 5 and may be performed once.

At step 806 in FIG. 8, a first file identifier in the first file-identifier set may be identified. This step is similar to step 808 where a second file identifier in the second file-identifier set may be identified. Steps 806 and 808 are also similar to steps 506 and 508 in FIG. 5, except steps 806 and 808 in FIG. 8 may be repeated numerous times. For example, server 206 in FIG. 2 may identify new first and second file identifiers if, after the completion of computer-implemented method 500 in FIG. 5, server 206 in FIG. 2 is still unable to determine which file set in on client 202. In one embodiment, server 206 may repeatedly identify new file sets until the result received from the client contains enough information to determine the file set.

In other embodiments, server 206 may repeatedly identify new file sets until the information contained in the result indicates that a file-set threshold has been exceeded. For example, the result may contain a value representing the number of transmissions that occur between the first and second computing systems during the process of identifying the file set. The file-set-identifier threshold may set a number of maximum transmissions. Method 800 in FIG. 8 may terminate once the number of transmissions between the client and server reaches the file-set-identifier threshold. Server 206 may transmit an unknown-file-set indication to client 202.

In another embodiment, the file-set-identifier threshold may be a ratio of the number of total file identifiers transmitted to the first computing system and the number of file-identifier sets associated with the key-file identifier. For example, server 206 in FIG. 2 may receive a result that contains a list of all the file identifiers received by client 202. Server 206 then may compare the total number of file identifiers against the number of file-identifier sets that contain the key-file identifier, and server 206 may determine whether the comparison exceeds a ratio defined by the file-set-identifier threshold. Method 800 may terminate if the total number of file identifiers divided by the number of file-identifier sets exceeds the ratio. Server 206 may transmit an unknown-file-set indication to client 202.

Steps 810 and 812 in FIG. 8 are identical to steps 510 and 512 in FIG. 5 with the exception that they are repeated. At step 814 in FIG. 8, a result may be used to identify a file set. For example, server 206 in FIG. 2 may analyze the result and determine the file set that exists on client 202. In certain embodiments, server 206 may be unable to determine the file set on client 202. In this situation, server 206 may attempt to identify new first and second file identifiers from the file-identifier sets associated with the key-file identifier as outlined in steps 806 and 808 in FIG. 8.

Figure 9:
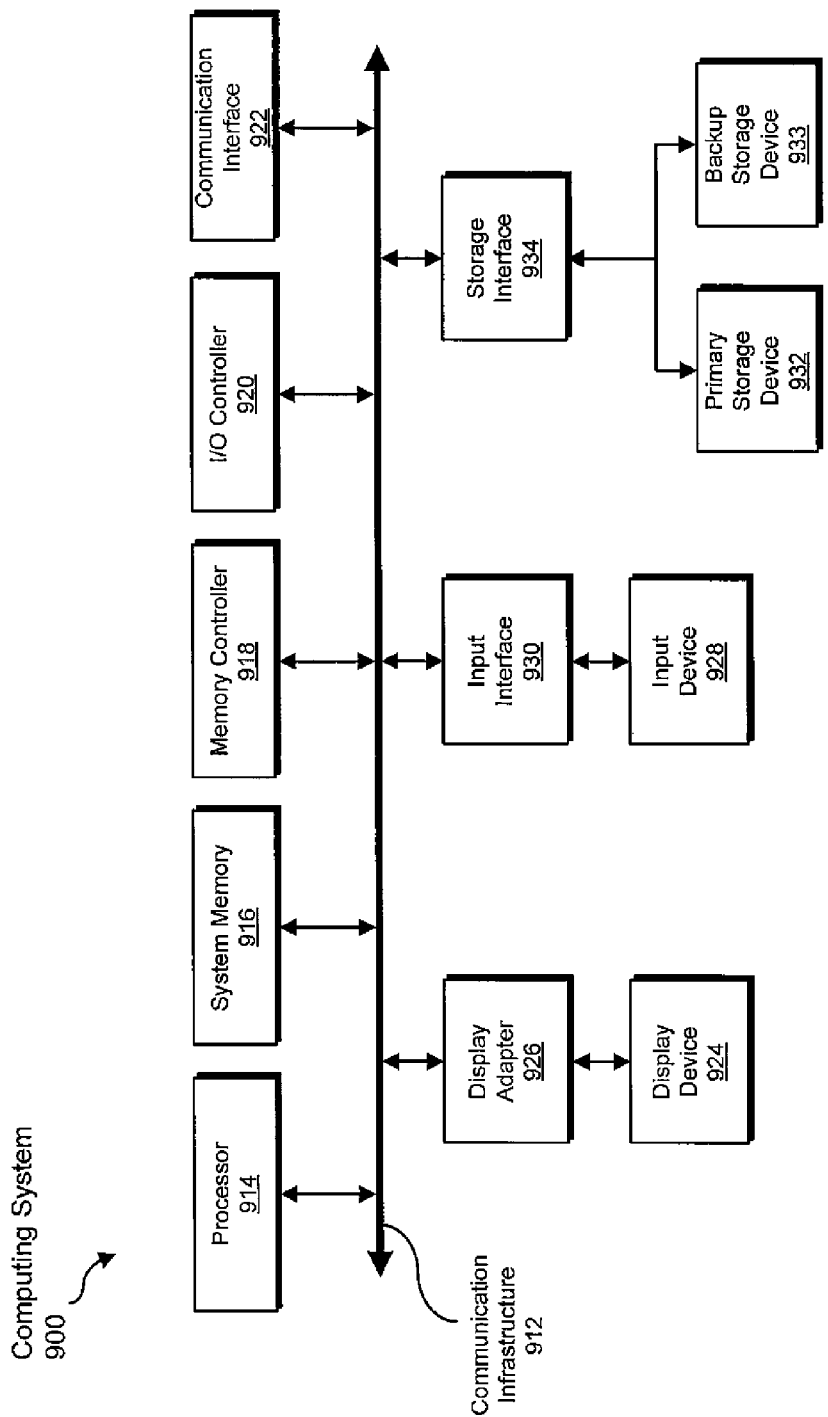
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, transmitting, receiving, determining, selecting, and using steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as identifying, transmitting, receiving, determining, selecting, and using.

I/O controller 920 generally represents any type or form of module capable of coordinating and/or controlling the input and output functions of a computing device. For example, in certain embodiments I/O controller may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the identifying, transmitting, receiving, determining, selecting, and using steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, transmitting, receiving, determining, selecting, and using steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, transmitting, receiving, determining, selecting, and using steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, the exemplary file systems disclosed herein may be stored on primary storage device 932, while the exemplary file-system backups disclosed herein may be stored on backup storage device 933. Storage devices 932 and 933 may also be used, for example, to perform and/or be a means for performing, either alone or in combination with other elements, one or more of the identifying, transmitting, receiving, determining, selecting, and using steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, transmitting, receiving, determining, selecting, and using steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, a computer-implemented method for determining a file set may comprise identifying a file set. The method may also comprise identifying a key file for the file set. A first computing system may comprise the file set. The method may further comprise transmitting a key-file identifier to a second computing system, the key-file identifier identifying the key file. The first computing system may receive the first and second file identifiers from the second computing system. The first file identifier may be associated with a first file-identifier set. The second file identifier may be associated with a second file-identifier set. The key-file identifier may be associated with both the first file-identifier set and the second file-identifier set. The method may comprise determining whether the file set comprises a file identified by the first file identifier, and whether the file set comprises a file identified by the second file identifier. The first computing system may transmit a result of the determination to the second computing system.

In certain embodiments, identifying a file set may comprise selecting a file directory, selecting a group of files within a directory, selecting files associated with a computer program, and selecting a plurality of files contained on a file storage device. In an additional embodiment, the key file may be a randomly selected file within the file set.

In at least one embodiment, determining a file set may further comprise identifying a set of key files from the file set. The first computing system may comprise the file set. Determining a file set may further comprise transmitting a set of key-file identifiers to the second computing system, wherein each key-file identifier in the set of key-file identifiers identifies a file in the set of key files. The method may also comprise receiving a plurality of file identifiers from the second computing system, wherein each file identifier in the plurality of file identifiers is associated with a different file-identifier set. The first computing system may determine which files identified by the plurality of file identifiers are contained within the file set.

In certain embodiments, the key-file identifier may comprise at least one of a file name of the key file, a version number of the key file, and a hash of the key file. The key-file identifier may also comprise a file size of the key file, a name of a directory where the key file is stored on the first computing system, and a system identifier for the first computing system.

In additional embodiments, wherein each of receiving the first and second file identifiers, determining whether the file set comprises the files identified by the first and second identifiers, and transmitting the result of the determination may be repeated. The aforementioned steps are repeated until the result provides the second computing system with enough information to identify the file set or the first computing system receives an unknown-file-set indication. In a further embodiment the result of the determination may comprise a system identifier for the first computing system, the key-file identifier, the first file identifier, and/or the second file identifier.

A computer implemented method for determining a file set may comprise receiving a key file identifier from a first computing system, the key file identifier identifying a key file associated with the file set. The second computing system may also identify first and second file-identifier sets associated with the key file. The method further comprises identifying a first file identifier in the first file-identifier set, and identifying a second file identifier in the second file-identifier set. The second computing system may transmit the first and second file identifiers to the first computing system. The method also comprises receiving a result from the first computing system, the result being based on a comparison of the first and second file identifiers with the file set. The second computing system may use the result to identify the file set.

In an additional embodiment, a computer implemented method for determining a file set may comprise a file-set database. The file-set database may comprise at least one of a table of file names, a table of file versions, a table of file hashes, a table of file directories, a table of file sets, a table of associations of files to file sets. In certain embodiments, identifying a first and second file identifier for the first and second file identifier set may comprise determining that the first file identifier is not in the second file-identifier set and determining that the second file identifier is not in the first file-identifier set.

In certain embodiments, a computer implemented method for determining a file set may further comprise receiving a set of key-file identifiers from the first computing system. The method may also comprise identifying a plurality of file-identifier sets associated with the set of key files, and identifying file identifiers associated with the plurality of file-sets. In a further embodiment, an identifier for the key file may comprise at least one of a file name of the key file, a version number of the key file, a hash of the key file, a file size of the key file, a name of a directory where the key file is stored on the first computing system. In an additional embodiment, the result may comprise a system identifier for the first computing system, the key-file identifier, the first file identifier, the second file identifier.

In certain embodiments, wherein identifying the first and second file identifiers for the first and second file set, transmitting the first and second file to the first computing system, and receiving a result is repeated. The aforementioned method is repeated until the result contains enough information to identify the file set or the result contains data that exceeds a file-set-identifier threshold. In a further embodiment the file-set-identifier threshold may comprise a ratio of the number of total file identifiers transmitted to the first computing system. The file-set-identifier threshold may also comprise the number of file sets associated with the key file and a number of transmissions between the first computing system and the second computing system, where the transmissions contain information to identify the file set. In an additional embodiment, an unknown-file-set indication is transmitted to the first computing system.

In an additional embodiment, the key-file identifier is transmitted to the first computing system. In a further embodiment, identifying the file set from the result may comprise identifying a file-identifier set containing the identifier for the key file and identifying a file-identifier set containing a file identifier transmitted in the result.

In certain embodiments, a computer-readable medium may comprise one or more computer executable instructions that, when executed by a computing system, cause the computing system to identify a file set; identify a key file for the file set, a first computing system comprising the file set; transmit a key-file identifier to a second computing system, the key-file identifier identifying the key file; receive first and second file identifiers from the second computing system, a first file identifier being associated with a first file-identifier set, a second file identifier being associated with a second file-identifier set, and the key-file identifier being associated with both the first file-identifier set and the second file-identifier set; determine at least one of whether the file set comprises a file identified by the first file identifier and whether the file set comprises a file identified by the second file identifier; transmit a result of the determination to the second computing system;

In an additional embodiment, one or more computer-executable instructions, when executed by the computing device, further cause the computing device to identify a set of key files from the file set, the first computing system comprising the file set, transmit a set of key-file identifiers to the second computing system, wherein each key-file identifier in the set of key-file identifiers identifies a file in the set of key files, receive a plurality of file identifiers from the second computing system, wherein each file identifier in the plurality of file identifiers is associated with a different file-identifier set, determine which files identified by the plurality of file identifiers are contained within the file set.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining a file set, at least a portion of the computer-implemented method being performed by a computing device comprising at least one processor, the computer-implemented method comprising:
   determining whether files in a file set are known-good files at least in part by:
      identifying the file set at least in part by identifying a set of files to be scanned during a security scan of a first computing system;
      identifying a key file for the file set, the first computing system comprising the file set, the presence of the key file on the first computing system implying the presence of the file set on the first computing system;
      transmitting a key-file identifier to a second computing system, the key-file identifier identifying the key file, instead of transmitting identifiers of each file in the file set, such that a resource load involved in determining whether the files in the file set are known-good files is reduced;
      receiving first and second file identifiers from the second computing system, the first file identifier being associated with a first file-identifier set, the second file identifier being associated with a second file-identifier set, and the key-file identifier being associated with both the first file-identifier set and the second file-identifier set;
   determining at least one of:
      whether the file set comprises a file identified by the first file identifier;
      whether the file set comprises a file identified by the second file identifier;
   transmitting a result of the determination to the second computing system.

2. The computer-implemented method of claim 1, wherein:
   identifying the key file for the file set comprises selecting a file that indicates to the second computing system that the file set is on the first computing system;
   the key file is representative of files in the file set.

3. The computer-implemented method of claim 1:
   wherein each file within the file set is subject to a security evaluation;
   wherein transmitting the key-file identifier to the second computing system comprises requesting security information regarding which files within the file set are known safe files without including an explicit identification of each file within the file set within the request;
   further comprising receiving the security information from the second computing system;

further comprising using the security information in the security evaluation.

4. The computer-implemented method of claim 1, further comprising:
   identifying a set of key files from the file set, the first computing system comprising the file set;
   transmitting a set of key-file identifiers to the second computing system, wherein each key-file identifier in the set of key-file identifiers identifies a file in the set of key files.

5. The computer-implemented method of claim 4, further comprising:
   receiving a plurality of file identifiers from the second computing system, wherein each file identifier in the plurality of file identifiers is associated with a different file-identifier set;
   determining which files identified by the plurality of file identifiers are contained within the file set.

6. The computer-implemented method of claim 1, wherein each of receiving the first and second file identifiers, determining whether the file set comprises the files identified by the first and second identifiers, and transmitting the result of the determination are repeated until:
   the result provides the second computing system with information to identify the file set; or
   the first computing system receives an unknown-file-set indication.

7. The computer-implemented method of claim 6, further comprising:
   in response to transmitting the result of the determination to the second computing system, receiving information indicating whether the files in the file set are known-good files;
   using the information indicating whether the files in the file set are known-good files during the security scan of the first computing system.

8. A computer-implemented method for determining a file set on a first computing system, at least a portion of the computer-implemented method being performed by a computing device comprising at least one processor, the computer-implemented method comprising:
   determining whether files in a file set are known-good files at least in part by:
     receiving a key file identifier from the first computing system, instead of receiving identifiers of each file in the file set, such that a resource load involved in determining whether the files in the file set are known-good files is reduced, the key file identifier identifying a key file associated with the file set, the presence of the key file on the first computing system implying the presence of the file set on the first computing system;
     identifying first and second file-identifier sets associated with the key file;
     identifying a first file identifier in the first file-identifier set;
     identifying a second file identifier in the second file-identifier set;
     transmitting the first and second file identifiers to the first computing system;
     receiving a result from the first computing system, the result being a result of determining at least one of:
       whether the file set comprises a file identified by the first file identifier;
       whether the file set comprises a file identified by the second file identifier;
     using the result to identify the file set, the file set including a set of files to be scanned during a security scan of the first computing system.

9. The computer-implemented method of claim 8, further comprising a file-set database, wherein the file-set database comprises at least one of:
   a table of file names;
   a table of file versions;
   a table of file hashes;
   a table of file directories;
   a table of file sets;
   a table of associations of files to file sets.

10. The computer-implemented method of claim 8, wherein identifying the first and second file identifiers for the first and second file-identifier sets comprises selecting file identifiers that are not in the intersection of the first and second file-identifier sets by:
    determining that the first file identifier is not in the second file-identifier set;
    determining that the second file identifier is not in the first file-identifier set.

11. The computer-implemented method of claim 8, further comprising:
    receiving a set of key-file identifiers from the first computing system;
    identifying a plurality of file-identifier sets associated with the set of key file identifiers;
    identifying file identifiers associated with the plurality of file-identifier sets.

12. The computer-implemented method of claim 8, wherein:
    identifying the first and second file-identifier sets associated with the key file is performed in an attempt to determine which file set is on the first computing system.

13. The computer-implemented method of claim 8, wherein the result comprises at least one of:
    a system identifier for the first computing system;
    the key file identifier;
    the first file identifier;
    the second file identifier.

14. The computer-implemented method of claim 8, wherein identifying the first and second file identifiers within the first and second file-identifier sets, transmitting the first and second file identifiers to the first computing system, and receiving the result are repeated until:
    the result contains information to identify the file set; or
    the result contains data that exceeds a file-set-identifier threshold.

15. The computer-implemented method of claim 14, wherein the file-set-identifier threshold comprises at least one of:
    a ratio of the number of total file identifiers transmitted to the first computing system and the number of file sets associated with the key file;
    a number of transmissions between the first computing system and the second computing system.

16. The computer-implemented method of claim 14, further comprising transmitting an unknown-file-set indication to the first computing system.

17. The computer-implemented method of claim 8:
    wherein using the result to identify the file set comprises determining that the first file-identifier set is associated with the file set;
    further comprising, in response to determining that the first file-identifier set is associated with the file set, transmitting the first file-identifier set, instead of the second file-identifier set, to the first computing system.

18. The computer-implemented method of claim 8, wherein identifying the file set from the result further comprises:
- identifying a file-identifier set containing the identifier for the key file;
- identifying a file-identifier set containing a file identifier transmitted in the result.

19. A non-transitory computer-readable storage medium comprising one or more computer-executable instructions that, when executed by a computing device, cause the computing device to:
- determine whether files in a file set are known-good files at least in part by:
- identifying the file set at least in part by identifying a set of files to be scanned during a security scan of a first computing system;
- identifying a key file for the file set, the first computing system comprising the file set, the presence of the key file on the first computing system implying the presence of the file set on the first computing system;
- transmitting a key-file identifier to a second computing system, the key-file identifier identifying the key file, instead of transmitting identifiers of each file in the file set, such that a resource load involved in determining whether the files in the file set are known-good files is reduced;
- receiving first and second file identifiers from the second computing system, the first file identifier being associated with a first file-identifier set, the second file identifier being associated with a second file-identifier set, and the key-file identifier being associated with both the first file-identifier set and the second file-identifier set;
- determining at least one of:
  - whether the file set comprises a file identified by the first file identifier;
  - whether the file set comprises a file identified by the second file identifier;
- transmit a result of the determination to the second computing system.

20. The non-transitory computer-readable storage medium of claim 19, wherein the one or more computer-executable instructions, when executed by the computing device, further cause the computing device to:
- identify a set of key files from the file set, the first computing system comprising the file set;
- transmit a set of key-file identifiers to the second computing system, wherein each key-file identifier in the set of key-file identifiers identifies a file in the set of key files;
- receive a plurality of file identifiers from the second computing system, wherein each file identifier in the plurality of file identifiers is associated with a different file-identifier set;
- determine which files identified by the plurality of file identifiers are contained within the file set.

* * * * *